(12) United States Patent
Nakagome et al.

(10) Patent No.: US 8,006,791 B2
(45) Date of Patent: Aug. 30, 2011

(54) AIR ROUTING STRUCTURE FOR A MOTORCYCLE, AND MOTORCYCLE INCLUDING SAME

(75) Inventors: Hiroshi Nakagome, Saitama (JP); Yoshitaka Seki, Saitama (JP); Akira Sonobata, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 1198 days.

(21) Appl. No.: 11/641,932

(22) Filed: Dec. 19, 2006

(65) Prior Publication Data

US 2007/0149105 A1    Jun. 28, 2007

(30) Foreign Application Priority Data

Dec. 28, 2005 (JP) .................. 2005-379674
Sep. 4, 2006 (JP) .................. 2006-238836

(51) Int. Cl.
*B60K 11/00* (2006.01)
(52) U.S. Cl. ............... 180/68.1; 180/68.2; 180/219
(58) Field of Classification Search ........ 180/68.1–68.3, 180/296, 302, 219, 229; 181/214, 229
See application file for complete search history.

(56) References Cited

U.S. PATENT DOCUMENTS

| | | | |
|---|---|---|---|
| 5,490,573 A | 2/1996 | Hagiwara et al. | |
| 6,422,332 B1 | 7/2002 | Takata et al. | |
| 7,357,205 B2 | 4/2008 | Nishizawa | |
| 7,380,624 B2 | 6/2008 | Momosaki | |
| 2004/0050357 A1 | 3/2004 | Idei et al. | |

FOREIGN PATENT DOCUMENTS

| | | |
|---|---|---|
| EP | 0 644 107 B1 | 2/1998 |
| EP | 1 087 127 A2 | 3/2001 |
| EP | 1 515 037 A1 | 3/2005 |
| JP | 4-306183 A | 10/1992 |
| JP | 4-306184 A | 10/1992 |
| JP | 8-158969 A | 6/1996 |
| JP | 2004-108258 | 4/2004 |
| JP | 2004-115018 | 4/2004 |
| JP | 2006-015963 A | 1/2006 |

*Primary Examiner* — J. Allen Shriver, II
*Assistant Examiner* — Katy Meyer
(74) *Attorney, Agent, or Firm* — Carrier Blackman & Associates, P.C.; Joseph P. Carrier; William D. Blackman

(57) ABSTRACT

An intake air passage, formed through a motorcycle body frame, reduces changes in pressure within an air routing duct member due to opening and closing of a throttle, and also reduces pipe resonance of the air routing duct member. The air routing duct member extends longitudinally from the intake air passage and directs fresh air to another air passage. The air routing duct member includes openings that communicate with hollow sections provided in a portion of an adjacent support structure, such as an instrumentation support member. When the throttle is opened rapidly, air from the hollow sections is temporarily supplied to the air routing duct member, reducing changes in internal air pressure in the air routing duct member due to throttle operation. Resonance chambers are formed above the air routing duct member, and communicate through communication pipes with a space within the air routing duct member to reduce duct pipe resonance.

15 Claims, 13 Drawing Sheets

AIR ROUTING STRUCTURE FOR A MOTORCYCLE, AND MOTORCYCLE INCLUDING SAME

CROSS-REFERENCE TO RELATED APPLICATIONS

The present invention claims priority under 35 USC 119 based on Japanese patent application No. 2005-379674, filed on Dec. 28, 2005, and Japanese patent application No. 2006-238836, filed on Sep. 4, 2006. The subject matter of these priority documents, including the written description, drawings, and claims, is incorporated by reference herein.

BACKGROUND OF THE INVENTION

1. Field of the Invention

The present invention relates to a motorcycle, and particularly relates to a motorcycle having an improved intake air passage structure.

2. Description of the Background Art

For the purpose of increasing the efficiency of air intake in a motorcycle engine, Japanese Patent Laid-open Publication No. 2004-115018 has proposed providing an air passage through a portion of a vehicle body frame. In this published reference, a duct member, which directs fresh air to the air passage, is oriented longitudinally in a front-rear direction of a vehicle body. The air is first introduced through a fresh air inlet, located frontward of the vehicle body frame, and is then routed to the duct member.

In the known motorcycle having such a structure, the air intake efficiency is increased. However, in addition to increased air intake efficiency, further benefit would be achieved if changes in negative pressure (vacuum) within the air routing duct member, due to opening and closing of a throttle, and reducing pipe resonance of the air routing duct member could be further reduced.

SUMMARY

The present invention provides a motorcycle capable of increased air intake efficiency, reduced changes in internal air pressure within an air routing duct member due to throttle operation, and reduced pipe resonance of the air routing duct member, in an air flow control structure which routes intake air through the vehicle body frame.

A first aspect of the present invention is directed to a motorcycle that includes an air passage formed through a section of the vehicle body frame, and an air routing duct member provided in a front-rear direction of a body of the motorcycle. The air routing duct member directs fresh air from a fresh air inlet, located in the front of the vehicle body frame, to the air passage in the body frame. The inventive motorcycle structure is characterized by including a structural component having a hollow auxiliary air chamber formed therein, the auxiliary air chamber having an auxiliary air outlet extending to, and communicating with the air routing duct member via an auxiliary air feed opening. The auxiliary air chamber is provided in a hollow section of a support member provided for supporting a functional component such as a speedometer.

A second aspect of the invention is directed to a motorcycle that includes an air passage extending through a portion of a vehicle body frame and an air routing duct member extending longitudinally in a front-rear direction of a vehicle body. The air routing duct member directs fresh air, introduced through a fresh air inlet located frontward of the vehicle body frame, to the air passage. The inventive motorcycle structure is characterized by including a structural component having a hollow auxiliary air chamber formed therein, the auxiliary air chamber having an auxiliary air outlet extending to, and communicating with the air routing duct member via an auxiliary air feed opening. The auxiliary air chamber is located above the air routing duct member and extends transversely to, for example, right and left from, the air routing duct member.

A third aspect of the invention is characterized in that, in addition to the inventive motorcycle structures described above with respect to the first or second aspects thereof, a baffle plate is provided upstream of the auxiliary air feed opening of the air routing duct member.

A fourth aspect of the invention is directed to a motorcycle that includes an air passage extending through a portion of a vehicle body frame, and an air routing duct member extending longitudinally in a front-rear direction of a vehicle body. The air routing duct member directs fresh air, introduced through a fresh air inlet located in front of the vehicle body frame, to the air passage of the frame. The inventive motorcycle structure is characterized by including a baffle member in the air routing duct member, the baffle member being a separate body from the air routing duct member and also being attached to the air routing duct member. In addition, at least a part of the baffle member defines an auxiliary air chamber within the air routing duct member.

A fifth aspect of the invention is characterized in that, in addition to the inventive motorcycle structures described above with respect to any of the first through fourth aspects thereof, a control member, for controlling an air inflow into the duct member, is interposed between the air routing duct member and the auxiliary air chamber.

A sixth aspect of the invention is characterized in that, in addition to the inventive motorcycle structures described above with respect to the fifth aspect thereof, the control member includes an opening area corresponding to a frequency of intake sound.

According to the first aspect of the present invention, a motorcycle includes an air passage, formed through a portion of a vehicle body frame, and an air routing duct member extending longitudinally in a front-rear direction of a vehicle body. The air routing duct member directs fresh air, introduced through a fresh air inlet located frontward of the vehicle body frame, to the air passage. The motorcycle includes a structural component having an auxiliary air chamber formed therein, where the auxiliary air chamber is provided with an auxiliary air outlet extending to, and communicating with the air routing duct member, where the auxiliary air chamber is provided in a hollow section of a support member which supports a functional component, such as a speedometer.

Accordingly, when the throttle is opened rapidly, auxiliary air, which has been stored at normal atmospheric pressure, is temporarily supplied to the air routing duct member from the auxiliary air chamber. This can reduce changes in air pressure within the air routing duct member due to operation of the throttle, while simultaneously reducing pipe resonance of the air routing duct member. Further, the auxiliary air chamber can be provided efficiently within the functional component support member.

According to the second aspect of the invention, a motorcycle includes an air passage formed through a portion of a vehicle body frame, and an air routing duct member extending longitudinally in a front-rear direction of a vehicle body. The air routing duct member directs fresh air, introduced through a fresh air inlet located in front of the vehicle body frame, to the air passage. The motorcycle includes structural component having a hollow auxiliary air chamber formed therein, the auxiliary air chamber having an auxiliary air outlet extending to, and communicating with the air routing duct member via an auxiliary air feed opening. The auxiliary air chamber is located above the air routing duct member, and extends to the right and left from the air routing duct member. Accordingly, when the throttle is opened rapidly, air from the auxiliary air chamber is temporarily supplied to the air routing duct member. This can reduce pressure drop within the air routing duct member due to throttle operation, and can reduce pipe resonance within the air routing duct member. Further, the auxiliary air chamber can be efficiently provided with an ensured capacity using a space located above the air routing duct member. Furthermore, since the auxiliary air chamber is located above the air routing duct member, it is less likely for water, dust and other contaminants to enter the auxiliary air chamber, and water and/or contaminants are less likely to accumulate there.

Furthermore, since the baffle plate is provided upstream of the auxiliary air inlet opening in the air routing duct member, the baffle plate straightens the flow of air within the air routing duct member with a synergetic effect with the air routing duct member, whereby the pulsating air flow, due to changes in air pressure within the air routing duct member and related components, is reduced.

In a motorcycle including an air passage formed through a portion of a vehicle body frame and an air routing duct member extending longitudinally in a front-rear direction of a vehicle body, the air routing duct member directs fresh air, introduced from a fresh air inlet located in front of the vehicle body frame, to the air passage of the frame. The air routing duct member includes a baffle member which is a separate body from the air routing duct member and attached to the air routing duct member, and at least a part of the baffle member defines a second auxiliary air chamber within the duct member. Accordingly, when the throttle is opened rapidly, air in the auxiliary air chamber is temporarily supplied to the air routing duct member. This can reduce changes in internal air pressure within the air routing duct member, due to throttle operation, while reducing pipe resonance of the air routing duct member. Further, since the second auxiliary air chamber is provided using a part of the baffle member, the number of components used is minimized.

Further, since the control member, which controls an air inflow, is interposed between the air routing duct member and the second auxiliary air chamber, the frequency properties of the intake sound can be freely changed.

Furthermore, since the control member includes an opening area corresponding to the frequency of the intake sound, a resonance chamber having desired frequency properties can be obtained.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
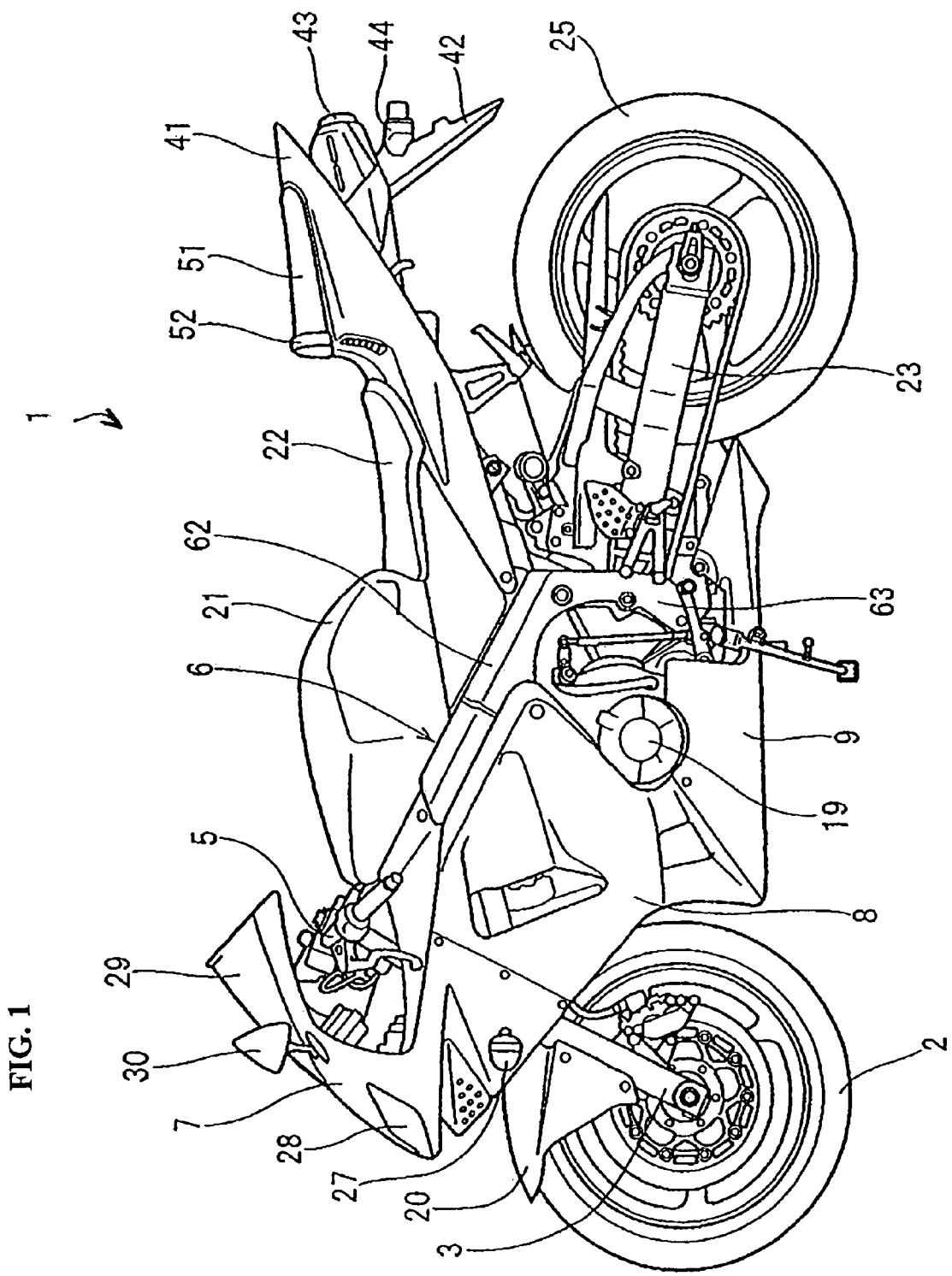
FIG. 1 is a side plan view of a motorcycle, showing an air intake structure according to an illustrative embodiment of the present invention.
Figure 2:
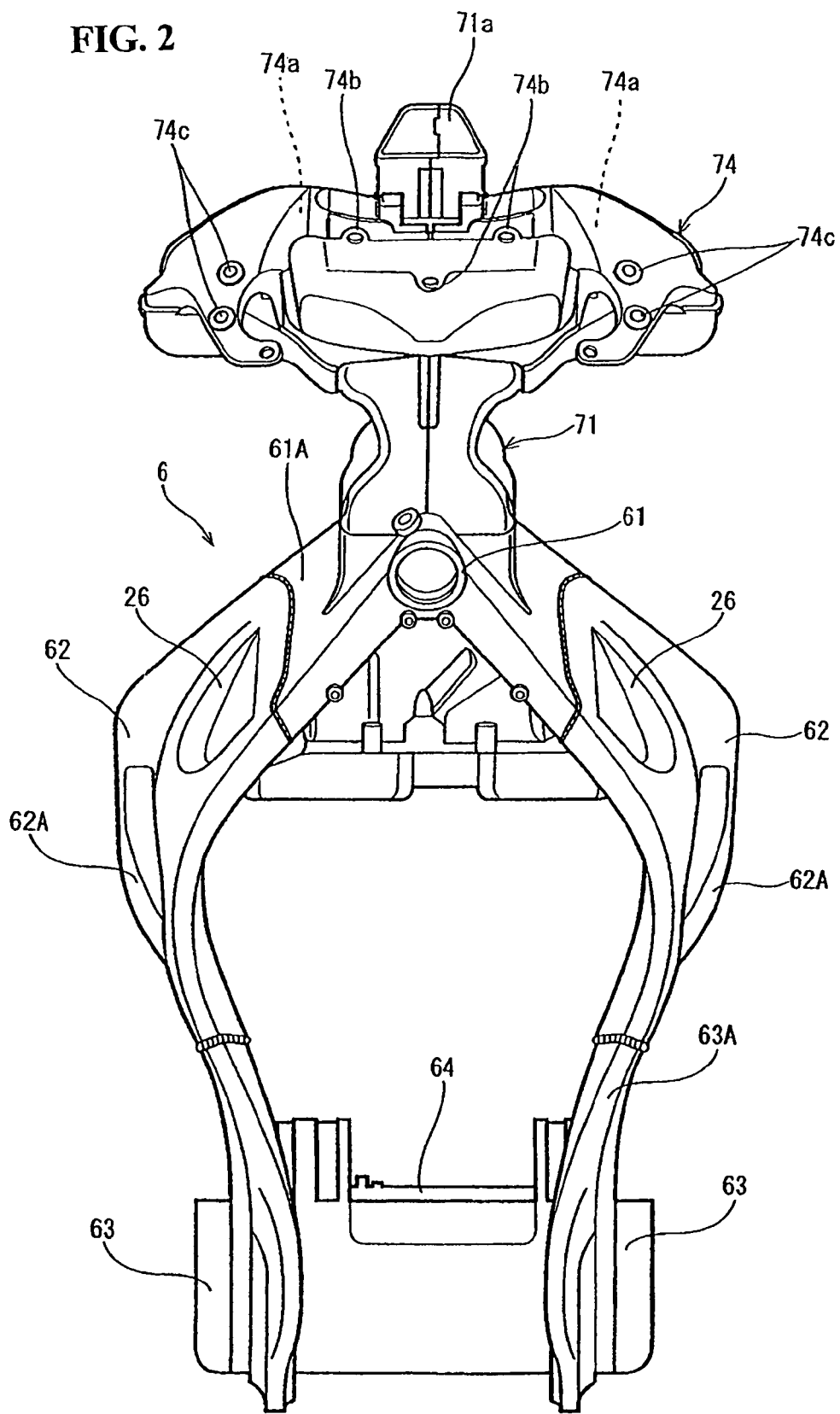
FIG. 2 is a top plan view of a frame and selected accessories of the motorcycle of FIG. 1, including a portion of the frame extending around a head pipe.

As shown in FIGS. 1 and 2, a motorcycle 1 includes a vehicle body frame 6, which may be formed from aluminum or from an aluminum alloy. The vehicle body frame 6 includes a head pipe 61; a pair of right and left main frame members 62 extending from the head pipe 61 obliquely downward and backward; a pair of right and left pivot plates 63 consecutive to rear portions of the main frame members 62; and a cross member 64 horizontally coupling these pivot plates 63 to each other.

Figure 6:
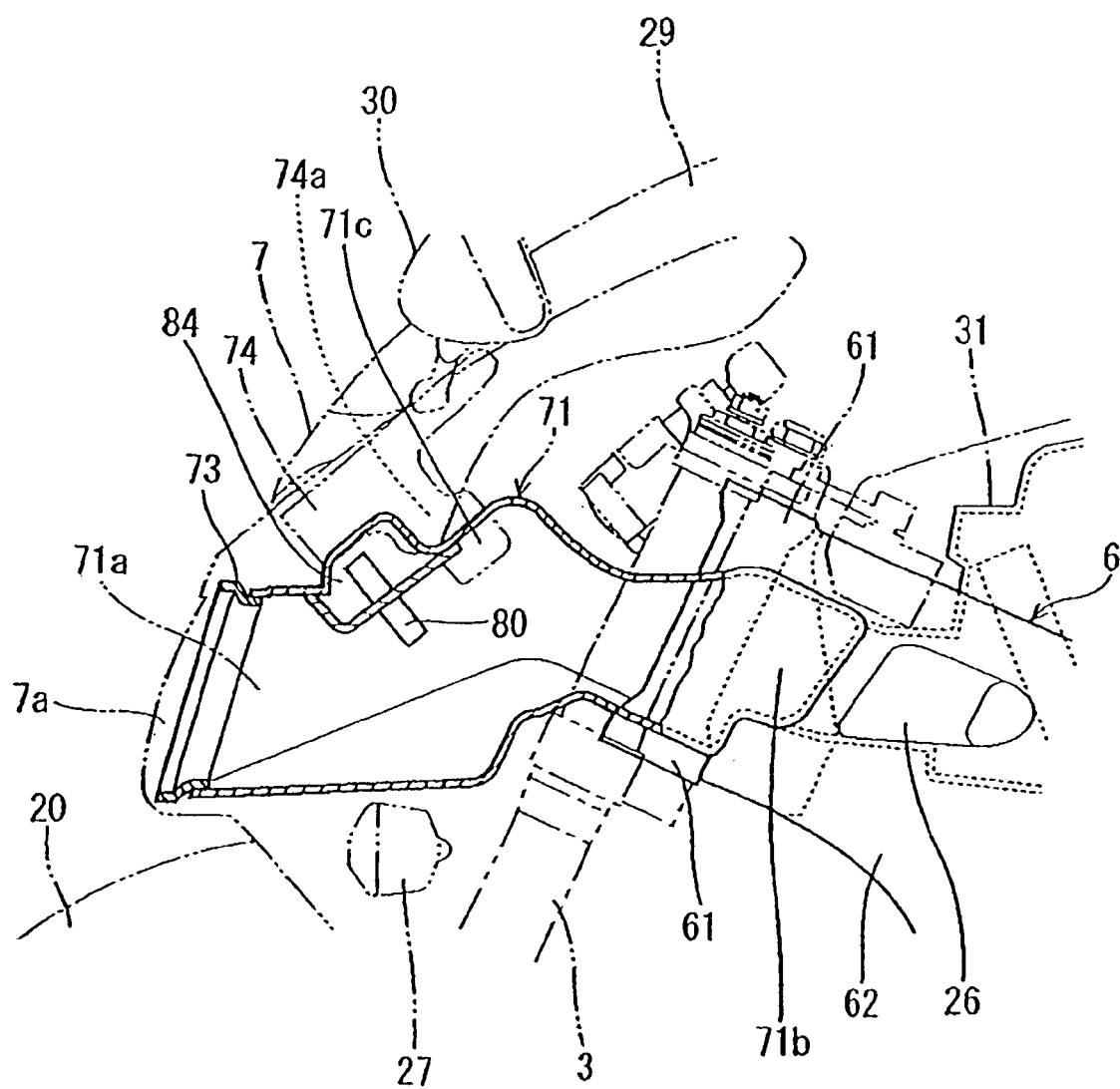
FIG. 6 is a detailed partial sectional view of an air routing duct member housed in the upper cowl of the motorcycle of FIG. 1.

As shown in FIGS. 2 and 6, each of the main frame members 62 has a respective open air passage 26 formed therethrough, in the vicinity of a connection between the main frame member and the head pipe 61. A rear portion of the air passage 26 is connected to an inlet of an air cleaner housing 31.

As shown in FIG. 2, the vehicle body frame 6 is separated into four primary casting components, which are integrally joined by welding. Specifically, the vehicle body frame is separated into a head pipe section 61A, a pair of right and left main frame sections 62A, and a pivot plate section 63A. The head pipe section 61A includes the head pipe 61 and front portions of the main frame members 62 integrated therewith. The right and left main frame sections 62A mainly include middle portions of the main frame members 62, respectively. The pivot plate section 63A includes the right and left pivot plates 63 coupled to each other with the cross member 64 interposed therebetween, and rear portions of the main frames 62 integrated therewith.

As shown in FIG. 1, the head pipe 61 of the vehicle body frame 6 is pivotally coupled to a front fork 3. A front wheel 2, including a hydraulic disk brake assembly, is rotatably supported on a lower end of the front fork 3. A front fender 20 is attached to, and supported by the front fork 3 above the front wheel 2. In addition, a steering handlebar 5 is attached to an upper end portion of the front fork 3.

An engine 19 is mounted in a center part of the vehicle body frame 6. In the illustrated embodiment, the engine 19 is a water-cooled, inline four-cylinder transverse-mounted engine. A pair of middle cowls 8 are provided on the right and left sides of the engine 19, respectively, and the middle cowls 8 are detachably and removably connected to an upper cowl 7. In addition, a pair of lower cowls 9 are detachably attached to the respective middle cowls 8 under the engine 19.

Furthermore, a fuel tank 21 is provided on the vehicle body frame 6 above the engine 19. A front seat 22 is also attached to the vehicle body frame 6 behind the fuel tank 21, and a rear seat (pillion seat) 51 is provided behind the front seat 22. A seat belt 52 is attached to the rear seat 51. A rear cowl 41 and a rear fender 42 are also attached to the vehicle body frame 6, below the front and rear seats 22 and 51, respectively. A brake lamp 43 and a pair of right and left rear turn signal lamps 44 are attached to the rear fender 42.

Further, as shown in FIG. 1, a swing arm (rear fork) 23 is swingably supported under the rear part of the vehicle body frame 6. A chain-driven rear wheel 25, including a hydraulic disk brake assembly, is rotatably supported at a rear end portion of the swing arm 23, below the rear fender 42.

Figure 3:
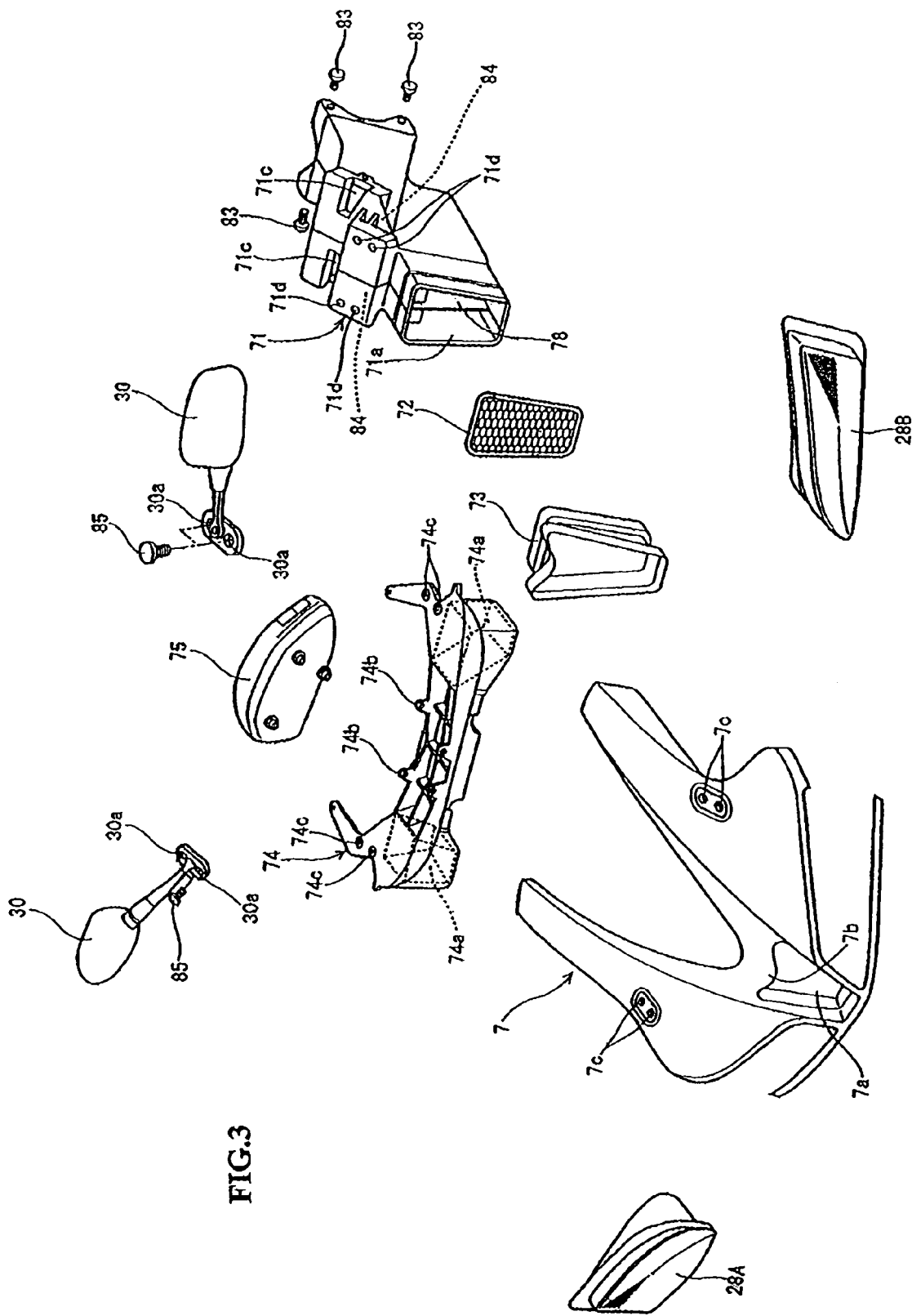
FIG. 3 is an exploded perspective view of selected front components of the motorcycle of FIG. 1.

In addition, as shown in FIGS. 2 and 3, an air routing duct member 71, made of fiberglass-reinforced plastic, is attached to the vehicle body frame 6 with four bolts 83. Four fastening sockets 71*d* are formed in an upper part of the air routing duct member 71, for receiving threaded fasteners.

Figure 7:
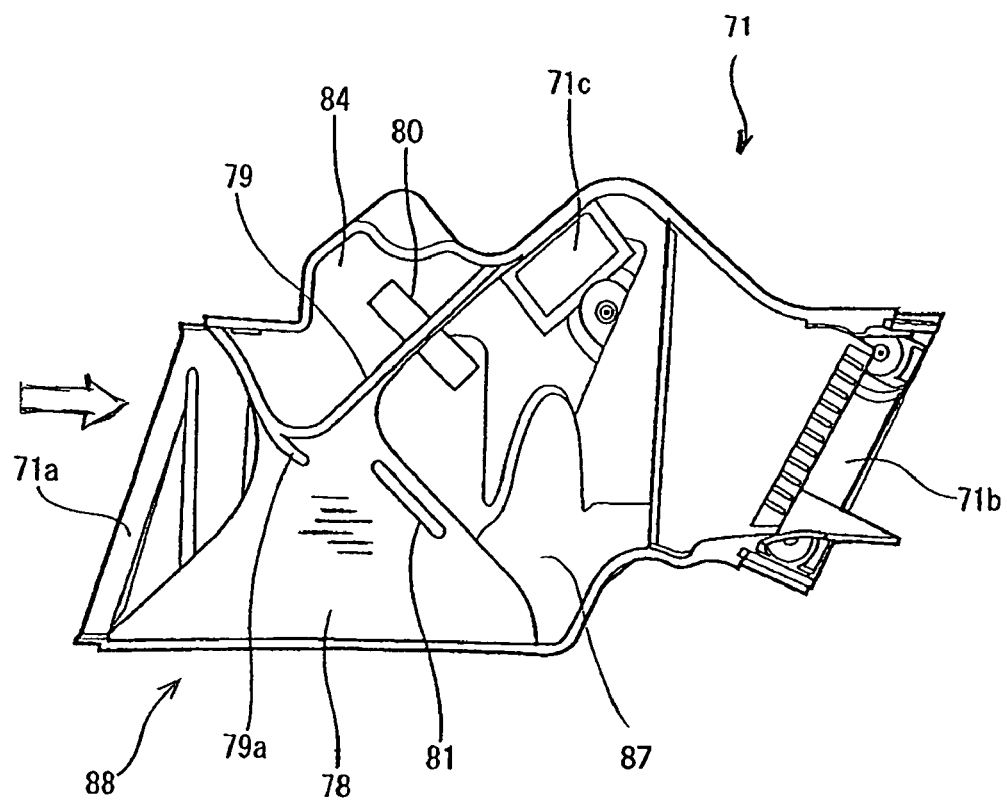
FIG. 7 is an isolated cross-sectional view of the air routing duct member of FIG. 6.
Figure 8:
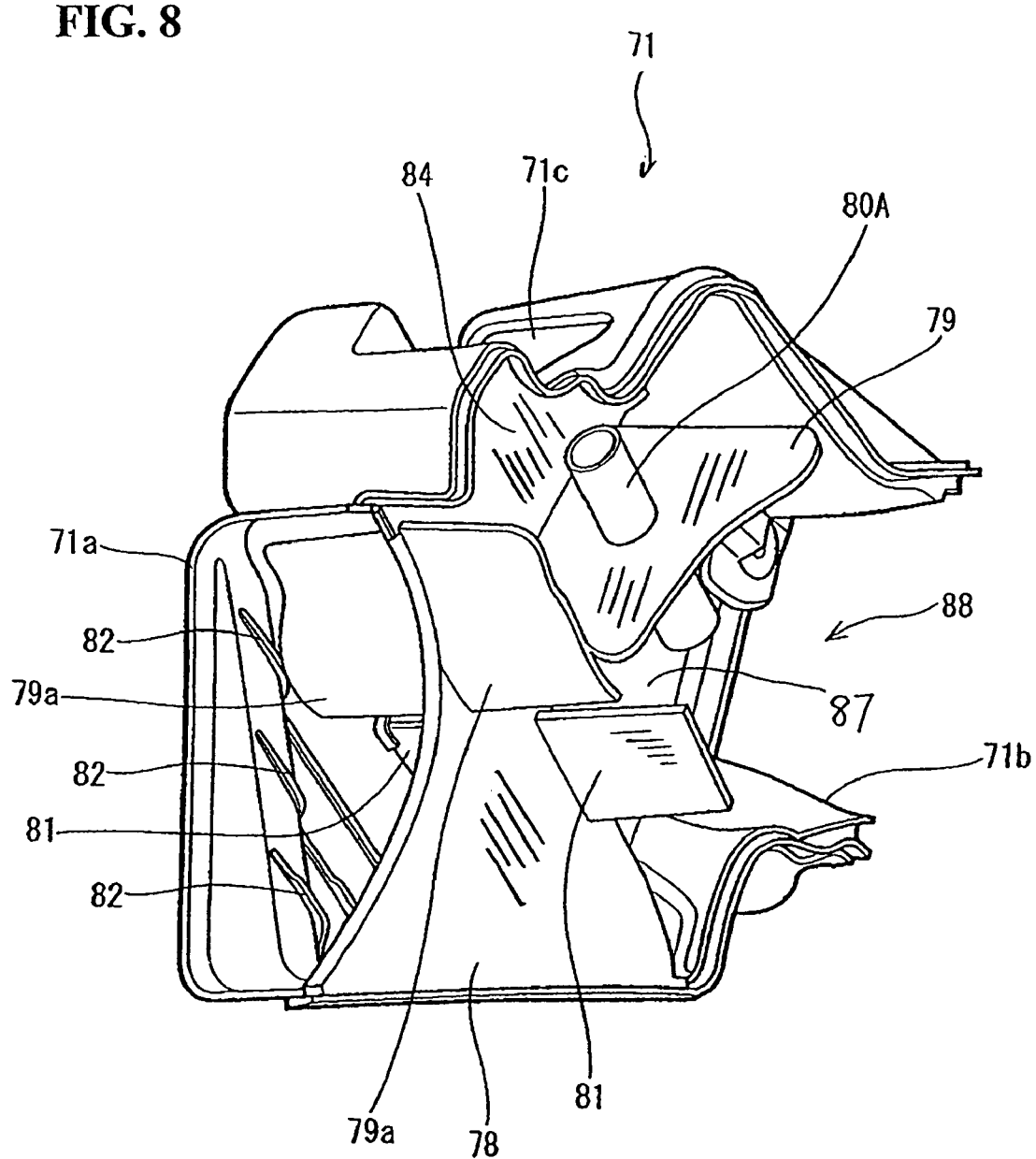
FIG. 8 is a perspective view of the air routing duct member of FIG. 7 when viewed obliquely from the front.

An instrumentation support member 74 is fastened to the air routing duct member 71, at the fastening sockets 71*d*, by screws or other suitable fasteners. The instrumentation support member 74 has right and left hollow sections formed therein, which define auxiliary air chambers 74*a*. These auxiliary air chambers 74*a*, respectively, communicate with the air routing duct member 71 through right and left auxiliary air inlet openings 71*c* formed in the upper surface of the air routing duct member 71, as shown in FIGS. 6 to 8. Suitable outlet openings are provided in the instrumentation support member to permit fluid communication between the respective auxiliary air chambers 74*a* and the interior of the air routing duct member 71, via the respective auxiliary air inlet openings 71*c*, when the instrumentation support member 74 is affixed in place on the air routing duct member.

Three attachment bosses 74*b* are formed on an upper middle portion of the instrumentation support member 74, as shown in FIGS. 2 and 3. A speedometer 75 is fastened on to the instrumentation support member 74 at the attachment bosses 74*b*. A pair of spaced-apart mirror attachment receptacles 74*c* are also formed in upper right and left end portions of the instrumentation support member 74.

The upper cowl 7, and a pair of right and left side mirrors 30, are fastened together to the mirror attachment receptacles 74*c*. Specifically, two bolt holes 30*a* are drilled through each side mirror 30, and pairs of bolt holes 7*c* are drilled through right and left ends of the upper cowl 7, respectively. The pair of right and left side mirrors 30 and upper cowl 7 are fastened together by bolts 85 inserted through the bolts holes 7*c* and 30*a* and screwed into the mirror attachment receptacles 74*c*. The upper cowl 7 is thus sandwiched between the side mirrors 30 and the instrumentation support member 74. The speedometer 75, the side mirrors 30, and upper cowl are all considered to be functional components.

As shown in FIGS. 1 and 3-5, a two-bulb headlight 28 (28A and 28B), a windscreen 29, and a pair of right and left front turn signal lamps 27 are also attached to the upper cowl 7.

As shown best in FIG. 3, a metallic mesh screen (bird repeller) 72 and a connector 73 made of synthetic rubber are sequentially attached to an intake port 71*a* at the front end of the air routing duct member 71, and a fresh air inlet opening 7*a* of the upper cowl 7 is inserted and fitted to the connector 73, to communicate with the air routing duct member 71. Incidentally, the fresh air inlet opening 7*a* of the upper cowl 7 is formed with an upper end portion 7*b* of the cowl extending downwardly, providing a good exterior appearance as shown in FIGS. 3 and 4.

Figure 4:
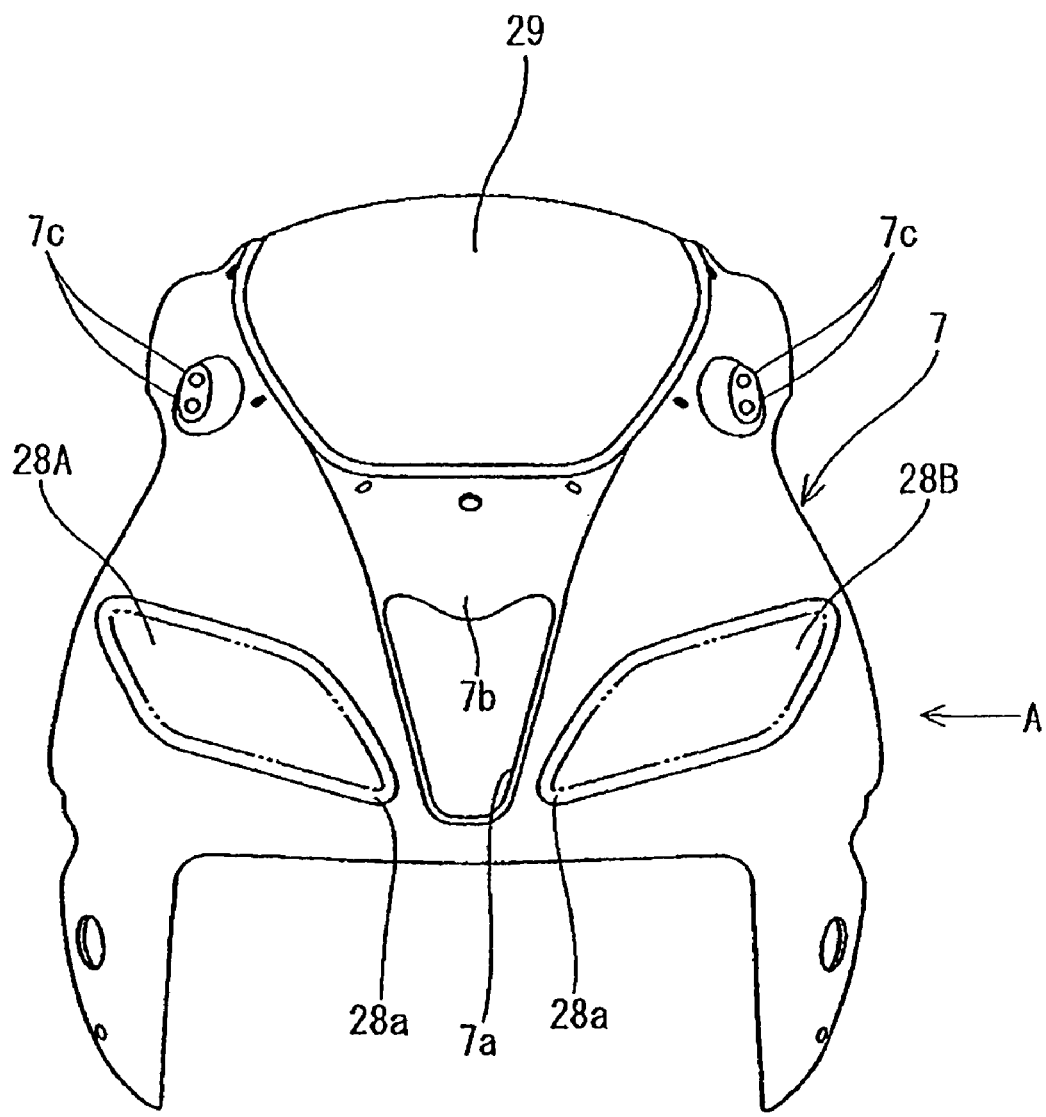
FIG. 4 is a front plan view of an upper cowl of the motorcycle of FIG. 1.
Figure 5:
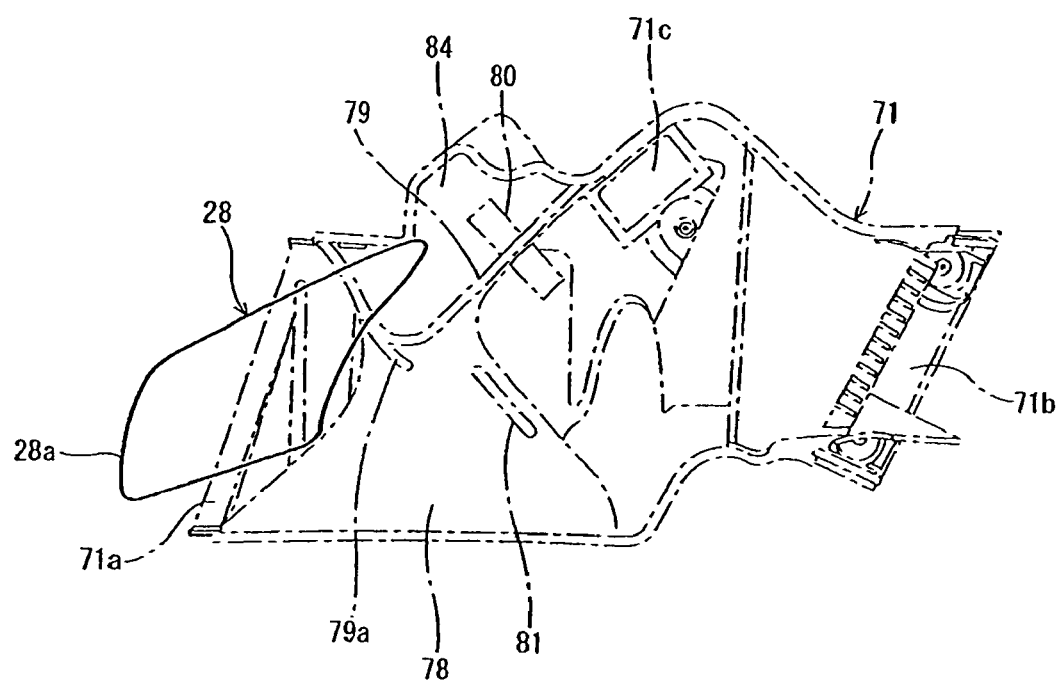
FIG. 5 is a view of the upper cowl as seen in the direction of an arrow A shown in FIG. 4.

Furthermore, as shown in FIG. 4, in each of the headlights 28A and 28B, an inner bottom end 28*a* is directed to (aligned with) the bottom end of the fresh air inlet opening 7*a* of the upper cowl 7. Further, as shown in FIGS. 4 and 5, the fresh air inlet opening 7*a* of the upper cowl 7 has a vertically long shape which is longer than the height (longitudinal length) of the headlight 28. The fresh air inlet opening 7*a* is also formed in a wedge or tapered shape, with an upper part that is laterally wider than the lower part thereof. It is therefore possible to ensure a sufficient cross section of the air routing duct member 71 by effectively using space between the two headlights 28A and 28B, whereby a high intake efficiency is obtained.

Figure 9:
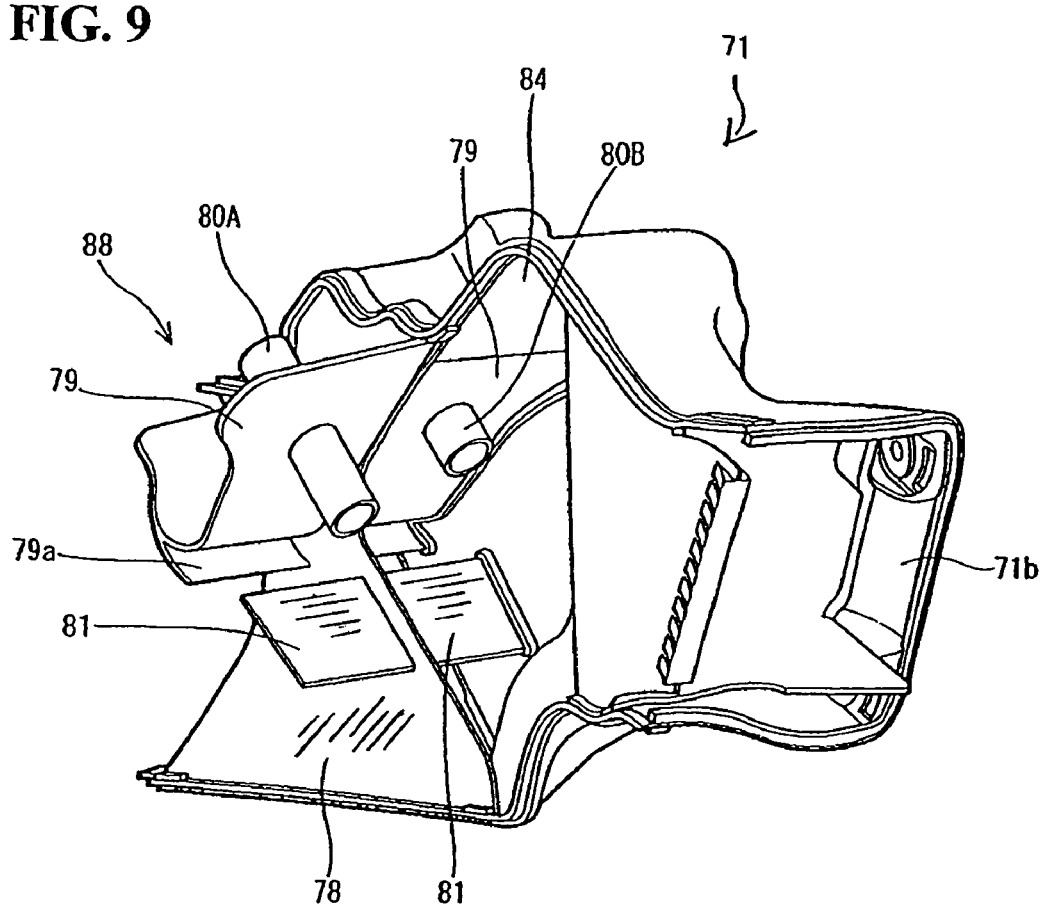
FIG. 9 is a perspective view of the air routing duct member of FIG. 7 when viewed obliquely from the rear.

The internal structure of the air routing duct member 71, and a separate baffle member 88 which fits therein, will now be described. As shown in FIGS. 7 to 9, a septum or baffle plate 78 is centrally provided within the air routing duct member 71. The baffle plate 78 is a plate-like member, which is oriented substantially vertically and extends substantially along a longitudinal centerline of the air routing duct member 71. The baffle plate 78 is disposed upstream of the auxiliary air inlet openings 71*c*. In addition, a pair of partition plates 79 extend right and left, respectively, from the right and left sides of the baffle plate 78, and are integrally formed therewith. The baffle plate 78 and partition plates 79 provide the main structure of the baffle member 88, which also includes upper and lower drain plates 79*a*, 81 for blocking entry of rain water into the duct member 71.

Portions of the upper space within the air routing duct member 71 are isolated by the partition plates 79, and separated by the baffle plate to form right and left resonance chambers (auxiliary air chambers) 84, while the spaces below the partition plates 79 form left and right air flow channels 87 in the duct member 71. The separate air flow channels 87 may be temporarily rejoined into a single air stream downstream of the baffle plate 78. It should be noted that the resonance chambers 84 are located under the fastening sockets 71*d* of the air routing duct member 71, as shown in FIGS. 2 and 3.

As shown in FIGS. 6 to 9, cylindrical communication pipes 80 (80A and 80B) are fit into the partition plates 79, respectively, so as to cause the spaces within the air routing duct member 71 to communicate with the resonance chambers 84. These two communication pipes 80A and 80B are different in pipe length.

Further, on both right and left sides of the baffle plate 78, upper drain plates 79*a* separate from the partition plates 79, respectively, and extend right and left so as to be obliquely inclined downward and backward. Further, a pair of diagonally-oriented lower drain plates 81 extend right and left from the partition plates 79 below and spaced a certain distance apart from the drain plates 79*a*, in such a way that the lower drain plates 81 are inclined obliquely downward and backward. Furthermore, as shown in FIG. 8, a plurality of thin reinforcing ribs 82, having a drainage effect, are formed to extend obliquely downward and backward on an inner wall of the air routing duct member 71.

In the motorcycle 1 having such a configuration described above, since the instrumentation support member 74 includes the hollow sections 74a, sufficient rigidity is ensured while an increase in weight is suppressed.

When the engine 19 of the motorcycle 1 is started, fresh air is supplied via the fresh air inlet opening 7a of the upper cowl 7, and passes through the air routing duct member 71 and the air cleaner housing 31 to the engine 19. At that time, intake noise occurs. The intake noise, however, can be attenuated by the resonator effect, since the resonance chambers 84 communicate with the air routing duct member 71 through the communication pipes 80.

Further, the two right and left communication pipes 80A and 80B are different in pipe length. Accordingly, the resonance frequencies can be therefore effectively attenuated in a case where the resonant frequency range is broad or the resonant frequencies provide a plurality of peaks.

Furthermore, while the motorcycle 1 is moving, fresh air, in the form of wind generated by the forward motion of the motorcycle, is introduced through the fresh air inlet opening 7a of the upper cowl 7 and then supplied to the engine 19 side through the air routing duct member 71 and air cleaner housing 31. Since the baffle plate 78 is provided within the air routing duct member 71, air flow can be substantially equalized on both sides thereof.

When the motorcycle 1 is operated in the rain, rain water mixed in the fresh air (that is, the wind generated by the forward motion of the motorcycle) enters the air routing duct member 71 through the fresh air inlet opening 7a of the upper cowl 7. However, the upper and lower drain plates 79a and 81 are provided within the air routing duct member 71 and are oriented in such a way to be opposed to the air flow, and the rain water can be substantially prevented from entering the air passage 26. Furthermore, the reinforcing ribs 82 formed on the inner wall of the air routing duct member 71 exert an added drainage effect, thus further preventing the entry of rainwater.

When the throttle is fully opened for rapid acceleration after deceleration, there is a case where an amount of air entering through the fresh air inlet opening 7a of the upper cowl 7 sometimes becomes short momentarily, and air pressure within the air routing duct member 71 begins to drop. Each hollow section 74a of the instrumentation support member 74, however, functions as an intake air pressure regulation chamber (air reservoir), and air from the hollow sections 74a is supplied, through the air routing duct member 71, to the engine 19. The motorcycle 1 can be therefore rapidly accelerated with a relatively well-balanced air-fuel ratio. This eliminates the need to separately provide the intake air pressure regulation chamber, thus increasing the flexibility in design of the motorcycle 1.

Further, since the screen 72 is interposed between the fresh air inlet opening 7a of the upper cowl 7 and the air routing duct member 71, it is possible to substantially prevent birds and insects from entering the air routing duct member 71 through the fresh air inlet opening 7a of the upper cowl 7 during operation of the motorcycle 1.

It should be noted that in the aforementioned embodiment, a description is given of the case where the hollow sections 74a of the instrumentation support member 74 communicate with the air routing duct member 71 through the auxiliary air inlet openings 71c.

Figure 10:
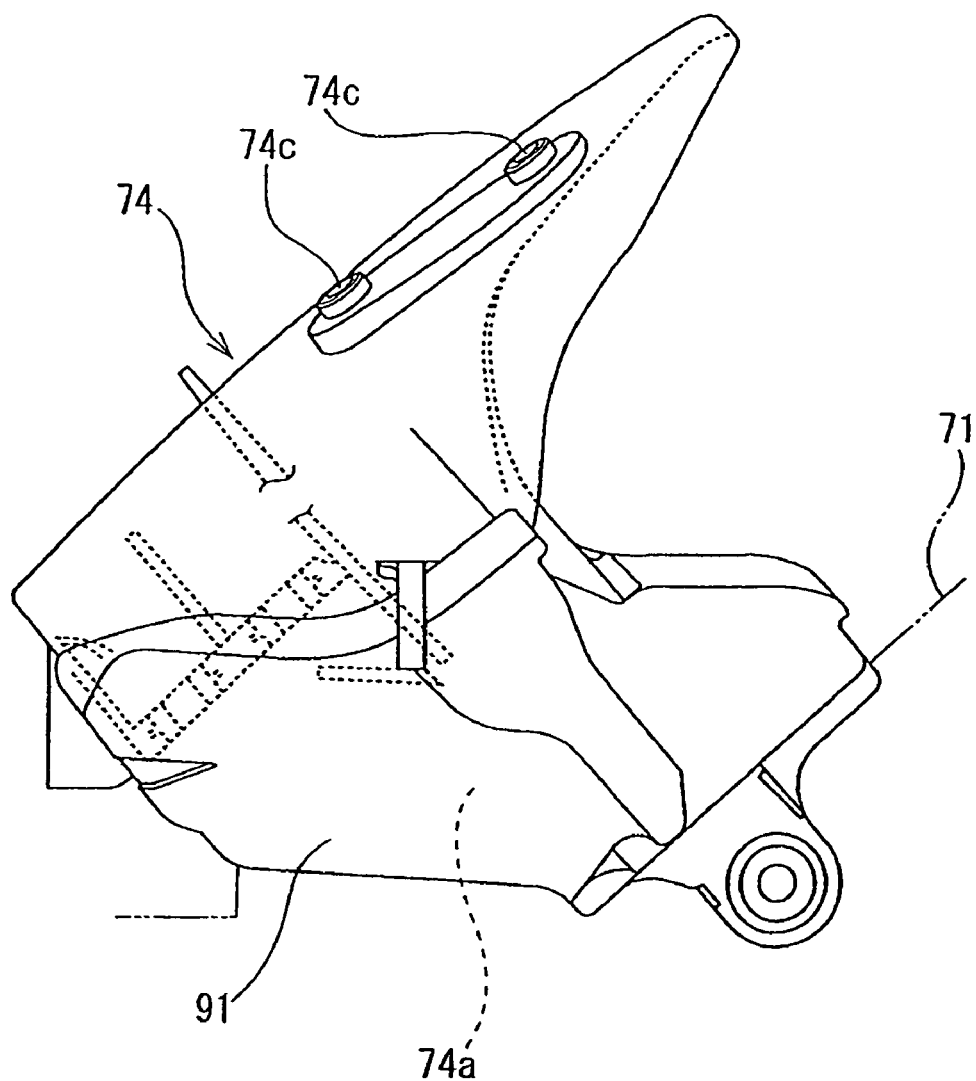
FIG. 10 is a side view showing an instrumentation support member in another embodiment of a motorcycle according to the present invention.
Figure 11:
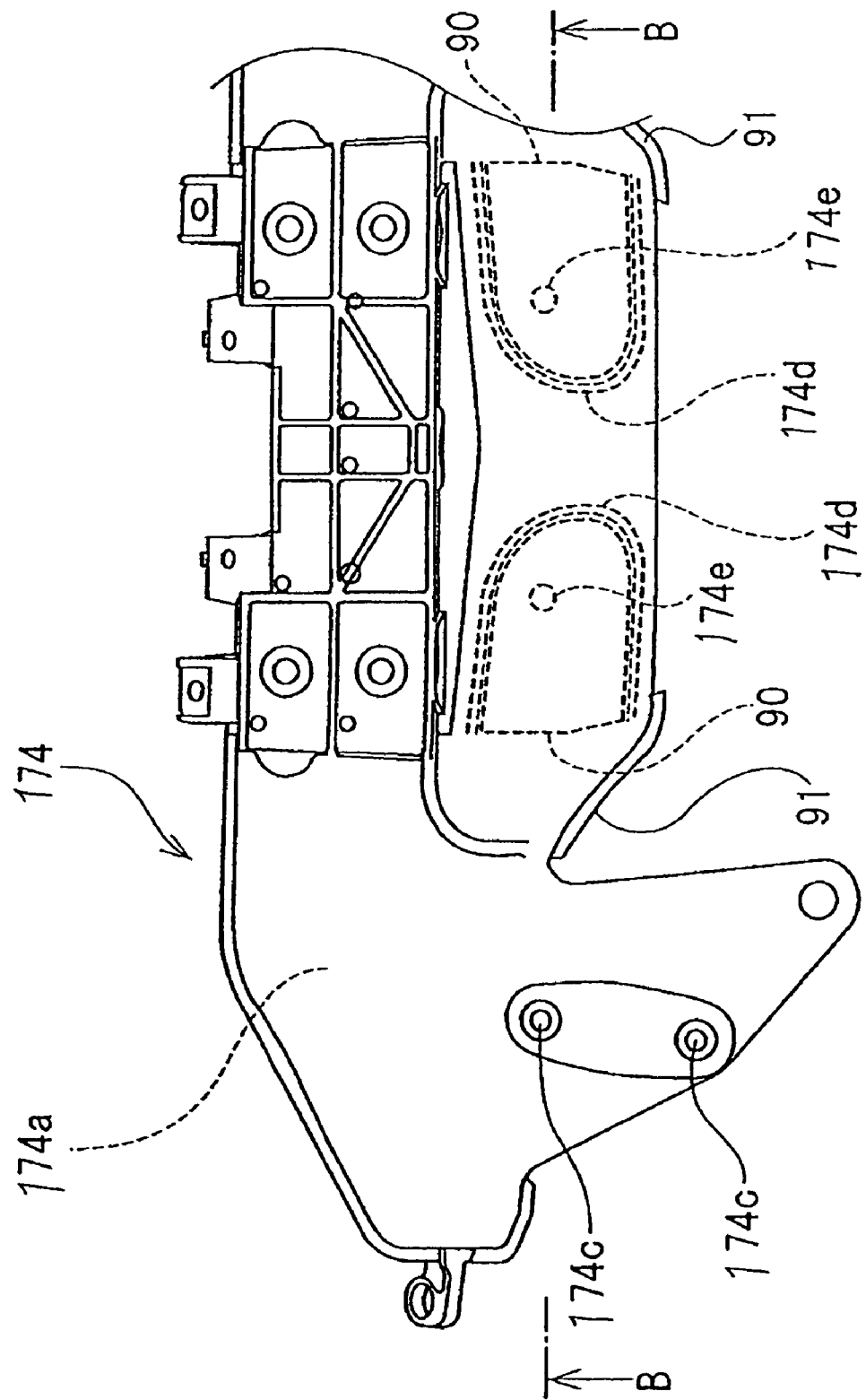
FIG. 11 is a plan view of the instrumentation support member of FIG. 10.
Figure 12:
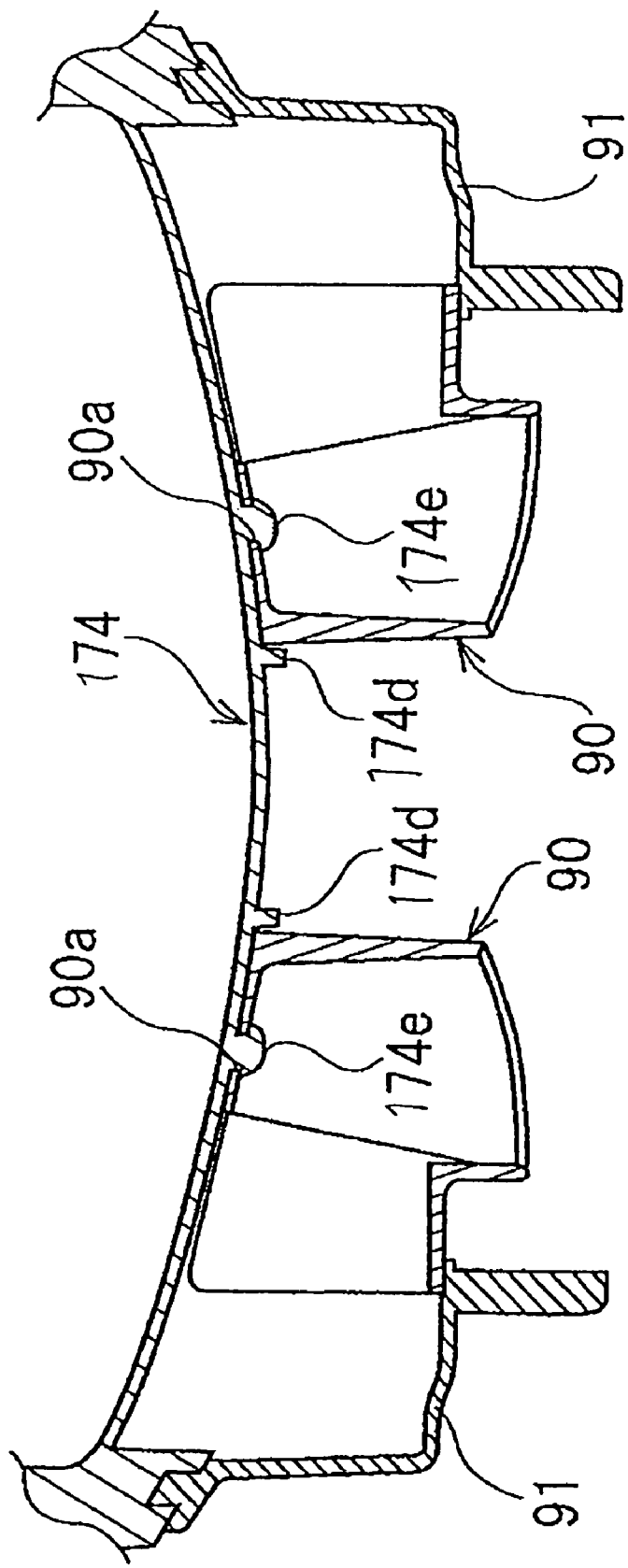
FIG. 12 is a cross-sectional view of the instrumentation support member of FIG. 10, taken along line B-B of FIG. 11.

As shown in FIGS. 10 to 12, however, in a second, alternate embodiment of the instrumentation support member 174, the hollow sections 174a can be configured to communicate with the air routing duct member 71 through L-shaped tubular separator chambers (control members) 90, which control air inflow. This makes it possible to freely change frequency properties of intake sound. It will be understood that the instrumentation support member 174 is substantially identical to the instrumentation support member 74 as previously described, except where it is shown and described differently herein.

Specifically, in this second embodiment, two right and left L-shaped tubular separator chambers 90, 90, having predetermined opening areas, are fixed to the instrumentation support member 174 by ultrasonic welding along respective substantially U-shaped guide members 174d, 174d formed in the instrumentation support member 174 as shown in FIGS. 11 and 12. Herein, the instrumentation support member 174 includes two right and left standing pins 174e, 174e, and each of the separator chambers 90 includes an insertion hole 90a formed thereon. The pins 174e are inserted in the respective insertion holes 90a and fixed in place by ultrasonic welding. These separator chambers 90, 90 cause the two right and left hollow sections 174a to communicate with the air routing duct member 71 in a manner so as to be sandwiched between two right and left caps 91, 91 attached to the instrumentation support member 174.

As described above, the separator chambers 90 are interposed between the air routing duct member 171 and the hollow sections 174a, respectively, so that the frequency of intake sound depends on the area of the openings of the separator chambers 90. The resonance chambers with desired frequency properties can be therefore obtained by preparing detachable separator chambers 90 with various opening areas and selecting and attaching proper ones of the separator chambers 90 corresponding to the frequency of the intake sound.

Figure 13:
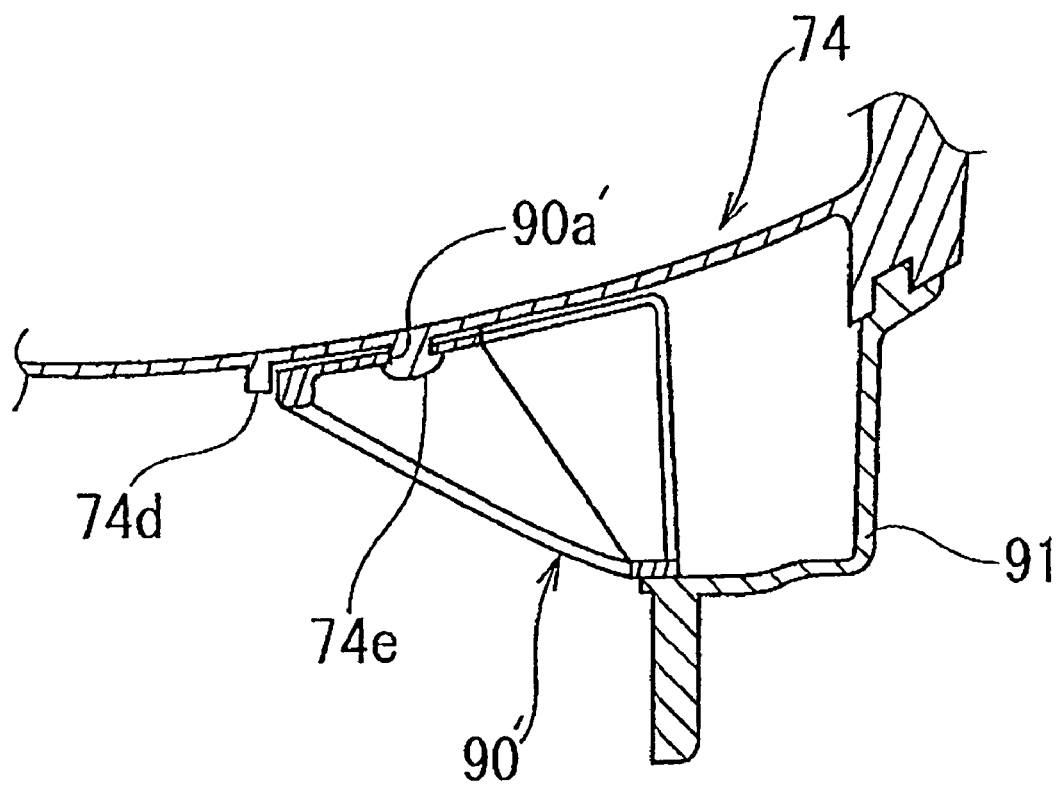
FIG. 13 is a cross-sectional view of an instrumentation support member in still another embodiment of a motorcycle according to the present invention.

The shape of the separator chambers 90 is not limited to the L-shaped tube. For example, the separator chambers 90' having an angular tube shape can be used instead as shown in FIG. 13.

In the aforementioned embodiment, the description is given of the case where the hollow sections 174a of the instrumentation support member 174 function as auxiliary air chambers for adjusting vacuum and the resonance chambers 84 function as auxiliary air chambers for air intake noise measures. In contrast, the resonance chambers 84 may be configured to function as the auxiliary air chamber for adjusting vacuum while the hollow sections 174a in the instrumentation support member 174 may be configured to function as the auxiliary air chamber for air intake noise measures vice versa. Alternatively, the hollow sections 174a in the instrumentation support member 174 and resonance chambers 84 both may be configured to function as the auxiliary air chambers for adjusting intake air pressure, or may be configured to n as the auxiliary air chambers for air intake noise measures.

The present invention can be widely applied to various types of motorcycles such as road sport types (European types), American types, off-road motorcycles, dual purpose motorcycles, and moto-crossers.

While a working example of the present invention has been described above, the present invention is not limited to the working example described above, but various design alterations may be carried out without departing from the present invention as set forth in the claims.

What is claimed is:

1. A motorcycle, comprising:
 a vehicle body frame having an air passage extending through a portion thereof;
 a fresh air inlet located proximate a front portion of the vehicle body frame;
 an air routing duct member extending longitudinally in a front-rear direction of the vehicle body frame, the air routing duct member configured to receive fresh air which has been introduced through the fresh air inlet and to deliver said fresh air to the air passage of the vehicle body frame, said air routing duct member having an auxiliary air inlet opening formed therein; said air routing duct member having at least one resonance chamber formed therein; and an instrumentation support member operatively attached to the air routing duct member, said instrumentation support member having a hollow section therein which defines at least one auxiliary air chamber, wherein the instrumentation support member has an opening therein which connects the auxiliary air chamber to the air routing duct member via the auxiliary air inlet opening in the air routing duct member, so as to permit fluid communication therebetween;

wherein said at least one resonance chamber is formed separately from said at least one auxiliary air chamber.

2. The motorcycle according to claim 1, wherein a baffle plate is provided in the air routing duct member, upstream of the auxiliary air inlet opening.

3. The motorcycle according to claim 2, wherein the baffle plate is oriented substantially vertically and extends through a portion of the air routing duct member proximate a longitudinal centerline thereof.

4. The motorcycle according to claim 3, wherein the air routing duct member further comprises a pair of partition plates, with a respective partition plate extending laterally outwardly from each of the right and left sides of the baffle plate, the partition plates defining right and left resonance chambers thereabove within the air routing duct member, and also defining air flow channels therebelow.

5. The motorcycle according to claim 4, wherein each of the partition plates has respective cylindrical communication pipe extending medially therethrough, so as to provide fluid communication between the respective air flow channels and the respective adjacent resonance chambers.

6. The motorcycle according to claim 1, wherein the instrumentation support member supports a speedometer thereon.

7. The motorcycle according to claim 1, wherein the auxiliary air inlet opening is formed at an upper side of the air routing duct member.

8. The motorcycle according to claim 1, wherein said resonance chamber is formed within an upper portion of the air routing duct member, the resonance chamber disposed between the opening in the air routing duct member and an upstream end of the air routing duct member.

9. The motorcycle according to claim 1, wherein the auxiliary air chamber communicates with the air routing duct member through a separator chamber interposed between the air routing duct member and the auxiliary air chamber, the separator chamber comprising an opening area,
wherein air flow through the separator chamber is determined by the opening area.

10. The motorcycle according to claim 9, wherein the separator chamber is a tubular member formed in an angled shape.

11. The motorcycle according to claim 10, wherein the separator chamber is a tubular member formed substantially in an L shape.

12. A motorcycle comprising:
a vehicle body frame having an air passage extending through a portion thereof;
a fresh air inlet located proximate a front portion of the vehicle body frame;
an air routing duct member extending longitudinally in a front-rear direction of the vehicle body frame, the air routing duct member directing fresh air introduced through the fresh air inlet to the air passage of the vehicle body frame, the air routing duct member configured to receive fresh air which has been introduced through a fresh air inlet and to deliver said fresh air to the air passage, said air routing duct member having an auxiliary air inlet opening formed therein; said air routing duct member having at least one resonance chamber formed therein; and
an instrumentation support member operatively attached to the air routing duct member, said instrumentation support member having a hollow section therein which defines an auxiliary air chamber, wherein the instrumentation support member has an opening therein which connects the auxiliary air chamber to the air routing duct member via the auxiliary air inlet opening in the air routing duct member, so as to permit fluid communication therebetween;
wherein said at least one resonance chamber is formed separately from said auxiliary air chamber.

13. The motorcycle according to claim 12, wherein a baffle plate is provided upstream of the opening in the air routing duct member.

14. The motorcycle according to claim 12, wherein a control member, which controls an air inflow, is interposed between the air routing duct member and the auxiliary air chamber.

15. The motorcycle according to claim 14 wherein the control member includes an opening area corresponding to a frequency of intake sound.

* * * * *